Figure 1:
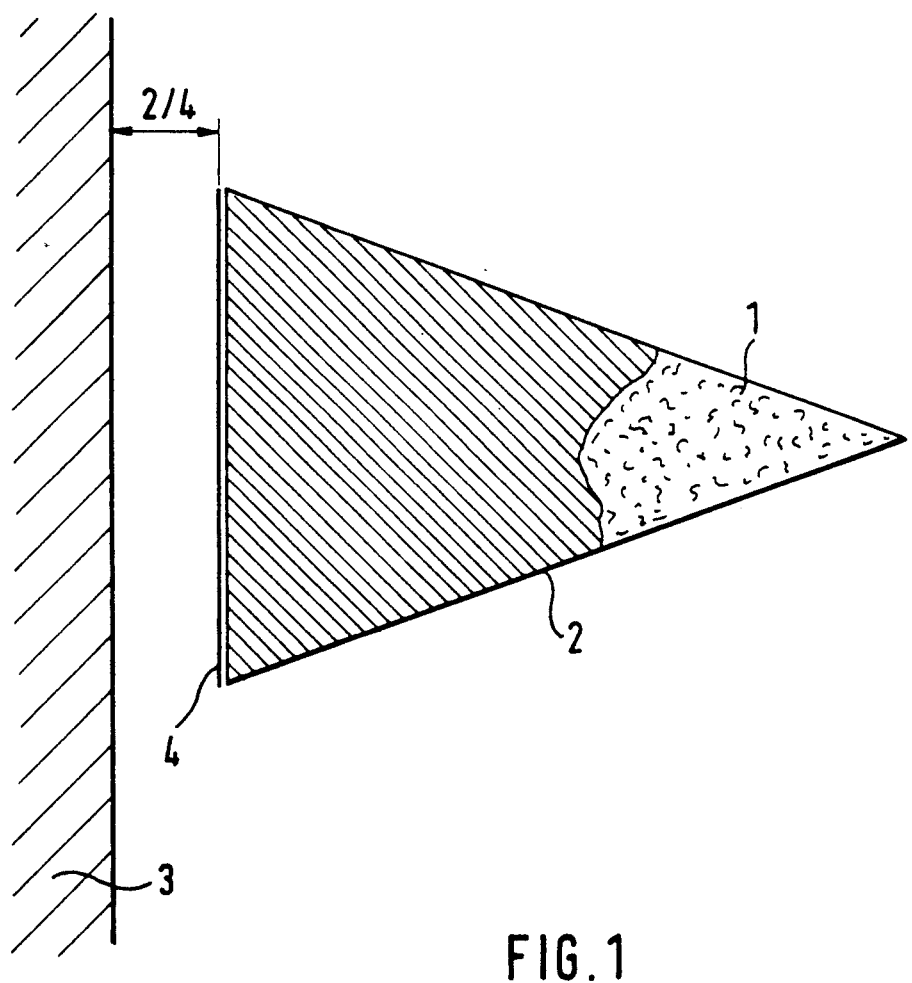

United States Patent
Schubert et al.

Patent Number: 5,304,750
Date of Patent: Apr. 19, 1994

[54] ABSORBER FOR ELECTROMAGNETIC AND ACOUSTIC WAVES

[75] Inventors: Rolf Schubert, Absteinach; Christian Körner, Weinheim-Rippenweiher, both of Fed. Rep. of Germany

[73] Assignee: G + H Montage GmbH, Burgermeister, Fed. Rep. of Germany

[21] Appl. No.: 389,672

[22] Filed: Aug. 4, 1989

[51] Int. Cl.$^5$ .................... E04B 1/74; H05K 9/00
[52] U.S. Cl. .................... 181/294; 181/293; 174/35 MS; 252/506; 342/1
[58] Field of Search .......... 181/290, 291, 293, 294; 174/35 R, 35 MS; 342/1, 4; 219/543; 252/506

[56] References Cited

U.S. PATENT DOCUMENTS

| | | | |
|---|---|---|---|
| 2,875,435 | 2/1959 | McMillan | 174/35 MS X |
| 2,877,286 | 3/1959 | Vance et al. | 342/1 |
| 2,977,591 | 3/1961 | Tanner | 342/1 |
| 3,568,196 | 3/1971 | Bayrd | 342/4 |
| 3,923,697 | 12/1975 | Ellis | 252/506 |
| 3,999,040 | 12/1976 | Ellis | 219/543 |
| 4,064,074 | 12/1977 | Ellis | 252/506 |
| 4,684,762 | 8/1987 | Gladfelter | 174/35 MS X |
| 4,862,174 | 8/1989 | Natio et al. | 342/1 |

FOREIGN PATENT DOCUMENTS

| | | | |
|---|---|---|---|
| 507981 | 12/1954 | Canada | 342/4 |

*Primary Examiner*—Benjamin R. Fuller
*Assistant Examiner*—Alrick Bobb
*Attorney, Agent, or Firm*—Finnegan, Henderson, Farabow, Garrett & Dunner

[57] ABSTRACT

An absorber for electromagnetic and acoustic waves comprising an absorber body containing mineral wool and particles of a conductive substance, in which the mineral wool is impregnated with a binder having the particles admixed therewith.

12 Claims, 1 Drawing Sheet

ABSORBER FOR ELECTROMAGNETIC AND ACOUSTIC WAVES

DESCRIPTION

The present invention relates to an absorber, particularly a wide-band absorber for electromagnetic and acoustic waves, comprising an absorber body containing mineral wool and particles of a conductive material.

Absorber of this type are particularly employed in low-reflection measuring enclosures. By lining the walls of such an enclosure with absorbers of this type it is possible to achieve a high reflection attenuation, resulting in conditions very similar to free space conditions.

Known absorbers consist mainly of organic materials, resulting in the serious disadvantage that they are combustible. Measuring enclosures equipped with absorbers of this type have therefore to be additionally provided with expensive fire-protection equipment. The durability of absorbers of this type is also rather limited.

Also known are absorbers for electromagnetic and acoustic waves consisting of non-combustible mineral wool impregnated with carbon or graphite powder or iron particles (fine chips) for achieving an absorption effect for electromagnetic waves in addition to the acoustic absorption effect of the mineral wool.

It is very difficult, to homogenously distribute such powdered material in the mineral wool, and the amount of powder which can be thus embedded is rather limited. The most serious disadvantage of known absorbers of this type is due to the fact, however, that the carbonaceous powder is capable of readily escaping from the mineral wool, which may result in heavy contamination of the measuring enclosure or even to malfunction of electric apparatus caused by deposits of this material. This gradual loss of the carbonaceous powder or iron particles additionally results in a loss of the electromagnetic wave absorption capacity.

It is an object of the invention to provide an absorber for electromagnetic and acoustic waves capable of ensuring the required cleanness in measuring enclosures and of durably retaining its absorption capacity.

This object is attained according to the invention by the provision that the mineral wool is impregnated with a binder having particles exhibiting electromagnetic wave absorption properties admixed therewith.

As a result of this provision, the particles responsible for the absorption of electromagnetic waves are fixedly bonded to the mineral wool to thereby effectively prevent contamination of respective enclosures or any degradation of the absorption capacity of the absorber body.

The binder may advantageously be selected from organic thermosetting or thermoplastic resins, but also from inorganic binders on the base of water glass or clay.

Particles permitting an absorption of electromagnetic waves to be achieved may be admixed in the form of graphite, carbon black, metal or ferrite powders, it being also possible to employ a mixture of these substances.

According to another advantageous embodiment of the invention, each absorber body may be enveloped in or contained in an enclosure such as an elastic woven or non-woven fabric acting to impart formstability to the absorber body mainly consisting of a fibre material.

It may in addition be advantageous to connect the absorber body to a resonance absorber designed for absorption in the meter-wave range. This resonance absorber permits a reduced overall installation depth to be achieved.

An embodiment of the invention shall now be described and explained in detail by way of example with reference to the accompanying drawing, wherein:

FIG. 1 shows an embodiment of an absorber according to the invention, comprising a conical absorber body and a sheet material resonance absorber.

The absorber shown in FIG. 1 comprises an absorber body formed of mineral wool (glass or rock wool) impregnated with a binder having particles exhibiting electromagnetic absorption properties admixed therewith, the absorption of acoustic waves being substantially accomplished by the absorber body. The employ of a binder as provided by the invention, and the admixture of the named particles to this binder results in the particles being fixedly bonded to the absorber body so as to ensure a constant electromagnetic wave absorption capacity.

Further advantages of this provision result from the fact that the particles admixed to the binder can be homogenously distributed throughout the absorber body, and that it is possible to achieve high particle concentrations, and thus a high absorption capacity.

The employed binder may advantageously be selected from various organic and/or anorganic substances. Suitable binders include melamine resins, formaldehyde resins, natural resins, thermoplastic resins or mixture of the named substances. It is also possible to employ synthetic resin dispersions or inorganic binders on the base of water, glass or clay.

The binder may have ferrite powder, carbon black, metal powder, graphite powder, or a mixture of these substances admixed thereto. Admixtures of carbonaceous particles result in a substantial increase of the complex dielectricity constant, while substances such as ferrite result in an increase of the complex permeability.

The absorber body, which in the present example is of wedge-shaped configuration, but which might also be of pyramid-shaped or conical configuration, is enveloped in an elastic woven or non-woven, for instance knitted fabric 2 closely conforming to the surfaces of the absorber body thanks to its elastic property. The thickness and/or mesh of the elastic woven or non-woven fabric is selected so that it does not impair the absorption effect of the absorber wedge.

In the embodiment shown in FIG. 1, the surface of the wedge facing away from its tip is lined with a sheet 4 formed of a material having an electric surface resistance of 377 Ohm/cm$^2$. This sheet acts as a resonance absorber for waves of the length $\lambda$, when the distance between the surface of the wedge facing away from its tip and a reflecting wall equals $\lambda/4$. The distance from the reflecting wall is selected so that a resonance absorption occurs in the meter-wave range of the electromagnetic spectrum. Loop antennas or dipoles embedded in the cone would also be useful as resonance absorbers.

We claim:

1. An absorber for electromagnetic and acoustic waves consisting essentially of a mass of mineral wool material impregnated throughout with a binder having particles of a conductive material admixed therewith, said mineral wool mass being contained in an enclosure.

2. The absorber of claim 1, wherein the binder is an organic or inorganic substance or a mixture thereof.

3. The absorber of claim 2 wherein the binder is selected from the group consisting of a thermosetting resin and a thermoplastic resin.

4. The absorber of claim 3, wherein the binder contains a melamine resin or a formaldehyde resin or a mixture thereof.

5. The absorber of claim 2, wherein a synthetic resin dispersion is used as the binder.

6. The absorber of claim 2, wherein the binder is selected from the group consisting of water, glass and clay.

7. The absorber of claim 1, wherein said particles are selected from the group consisting of graphite powder, carbon black, conductive metal powder and ferrite powder or mixtures thereof.

8. The absorber of claim 1, wherein said enclosure is of wedge-shaped, conical or pyramid-shaped configuration.

9. The absorber of claim 1, wherein said enclosures an elastic woven or knitted fabric.

10. The absorber of claim 1, which is connected to a sheet of resonance absorber material.

11. The absorber of claim 10, wherein a sheet of resistor material is disposed on a surface of said enclosure forming the sheet of resonance absorber material thereon.

12. The absorber of claim 10, wherein said sheet of resonance absorber material is configured for absorption in a meter-wave range.

* * * * *

UNITED STATES PATENT AND TRADEMARK OFFICE
CERTIFICATE OF CORRECTION

PATENT NO. : 5,304,750
DATED : April 19, 1994
INVENTOR(S) : Rolf Schubert et al.

It is certified that error appears in the above-indentified patent and that said Letters Patent is hereby corrected as shown below:

Claim 9, column 4, line 4, change "enclosures" to

--enclosure is--.

Signed and Sealed this

Twenty-seventh Day of September, 1994

Attest:

BRUCE LEHMAN

Attesting Officer

Commissioner of Patents and Trademarks